(12) United States Patent
Alkhalifah

(10) Patent No.: US 11,448,790 B2
(45) Date of Patent: Sep. 20, 2022

(54) METHOD FOR PARTIAL DIFFERENTIAL EQUATION INVERSION OF DATA

(71) Applicant: KING ABDULLAH UNIVERSITY OF SCIENCE AND TECHNOLOGY, Thuwal (SA)

(72) Inventor: Tariq Ali Alkhalifah, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 0 days.

(21) Appl. No.: 17/049,695

(22) PCT Filed: Apr. 16, 2019

(86) PCT No.: PCT/IB2019/053146
§ 371 (c)(1),
(2) Date: Oct. 22, 2020

(87) PCT Pub. No.: WO2019/224623
PCT Pub. Date: Nov. 28, 2019

(65) Prior Publication Data
US 2021/0080606 A1    Mar. 18, 2021

Related U.S. Application Data

(60) Provisional application No. 62/676,017, filed on May 24, 2018.

(51) Int. Cl.
*G01V 1/34* (2006.01)
*G01V 1/28* (2006.01)
*G01V 1/30* (2006.01)

(52) U.S. Cl.
CPC .............. *G01V 1/34* (2013.01); *G01V 1/282* (2013.01); *G01V 1/301* (2013.01); *G01V 2210/614* (2013.01); *G01V 2210/675* (2013.01)

(58) Field of Classification Search
USPC .......................................................... 702/11
See application file for complete search history.

(56) References Cited

U.S. PATENT DOCUMENTS

| 9,772,413 B2 | 9/2017 | Krohn et al. |
| 2010/0088035 A1* | 4/2010 | Etgen ............. G01V 1/30 702/14 |

(Continued)

FOREIGN PATENT DOCUMENTS

GB    2538807 A    11/2016

OTHER PUBLICATIONS

Abubakar, A., et al., "Three-Dimensional Seismic Full-Waveform Inversion Using the Finite-Difference Contrast Source Inversion Method," Geophysical Prospecting, Mar. 22, 2011, pp. 1-15, European Associate of Geoscientists & Engineers.

(Continued)

*Primary Examiner* — Paul D Lee
(74) *Attorney, Agent, or Firm* — Patent Portfolio Builders PLLC

(57) ABSTRACT

A method for partial differential equation inversion, the method including receiving measured data do; selecting an objective function having first and second measures $N_1$ and $N_2$, wherein the objective function depends on three independent variables V, u, and f, V being a perturbation of a wave equation operator L from a background operator $L_0$, u being a wavefield that satisfies the wave equation operator L, and f being a source function that describes the source of the waves; optimizing with a processor the objective function by finding a minimum or a maximum using the inversion; calculating with the processor solutions $V^*$, $u^*$, and $f^*$ of the three independent variables V, u, and f; and generating with the processor an image of an object based on the solutions $V^*$, $u^*$, and $f^*$.

20 Claims, 8 Drawing Sheets

(56) References Cited

U.S. PATENT DOCUMENTS

| | | |
|---|---|---|
| 2016/0025878 A1 | 1/2016 | Shin |
| 2016/0070023 A1* | 3/2016 | Herrmann et al. |
| 2017/0168177 A1* | 6/2017 | Wang ..................... G01V 1/282 |
| 2019/0179047 A1* | 6/2019 | Kim ....................... G01V 1/282 |

OTHER PUBLICATIONS

International Search Report in corresponding/related International Application No. PCT/IB2019/053146, dated Jul. 23, 2019.
Kleinman, R.E., et al., "A Modified Gradient Method for Two-Dimensional Problems in Tomography," Journal of Computational and Applied Mathematics, Sep. 8, 1992, vol. 42, pp. 17-35, Elsevier Science Publishers B.V.
Van Leeuwen, T., et al., "Mitigating Local Minima in Full-Waveform Inversion by Expanding the Search Space," Geophysical Journal International, Jul. 30, 2013, vol. 195, pp. 661-667, Oxford University Press on behalf of The Royal Astronomical Society.
Virieux, J., et al., "An Overview of Full-Waveform Inversion in Exploration Geophysics," Geophysics, Nov.-Dec. 2009, vol. 74, No. 6, pp. WCC127-WCC152, Society of Exploration Geophysicists.
Written Opinion of the International Searching Authority in corresponding/related International Application No. PCT/IB2019/053146, dated Jul. 23, 2019.
Substantive Examination Report in corresponding/related SA Application No. 520420598, dated Jul. 31, 2022.

\* cited by examiner

METHOD FOR PARTIAL DIFFERENTIAL EQUATION INVERSION OF DATA

CROSS-REFERENCE TO RELATED APPLICATIONS

This application is a U.S. National Stage Application of International Application No. PCT/IB2019/053146, filed Apr. 16, 2019, which claims priority to U.S. Provisional Patent Application No. 62/676,017, filed on May 24, 2018, entitled "METHOD FOR PARTIAL DIFFERENTIAL EQUATION INVERSION OF DATA," the disclosures of which are incorporated herein by reference in their entirety.

BACKGROUND

Technical Field

Embodiments of the subject matter disclosed herein generally relate to methods and devices for processing data, and more specifically, to applying a method of partial differential equation inversion to seismic data acquired for a given subsurface of the Earth.

Discussion of the Background

Seismic (or wave, in general) data acquisition and processing techniques generate a profile (image) of the geophysical structure (subsurface) under the surface of the Earth or any object under investigation. While this profile, for oil exploration purposes, does not provide an accurate location for oil and gas reservoirs or other resources, it suggests, to those trained in the field, the presence or absence of oil and/or gas. Thus, providing a high-resolution image of the subsurface (or objects in general) is an ongoing process for the exploration of natural resources, including, among others, oil and/or gas. The waveform inversion method is one ingredient for calculating an image of the subsurface. However, the traditional waveform inversion approaches are plagued by various problems that are now discussed.

The waveform inversion may be used for detecting objects using measurements of seismic, ultrasonic, or electromagnetic data (illuminating the medium in which such waves propagate, like the earth). The propagation of seismic (sound) and/or electromagnetic waves (or waves in general) in a medium is influenced by the properties of the medium, and especially by the sources that generate such waves, as well as their scattering objects. When the scattered waves (reflections and/or refractions) are recorded, it is possible to extract such properties of the earth, or any representation of them, in a process that is called in the art "inversion." The classic inversion method suffers from the sinusoidal nature of the waves. This nature of the waves induces cycle skipping. This classic method is also affected by the highly nonlinear relation between the medium's properties and the wave behavior in such a medium. Thus, improvements in the performance of the waveform inversion process is desired for many applications as the cost of inversion processing is high.

Using sensors for recording waves over some period of time, where the waves may originate from active or natural sources, including ambient noise, is now prevalent in many applications ranging from medical imaging, reverse engineering, nondestructive testing, and, of course, delineating the Earth's physical properties. The recorded signals carry information about the object they originated from (i.e., the source) and also about the medium they traveled through. The state of these waves as a function of space and time are referred to as wavefields. Thus, these functions depend on the source of the wavefield energy and the medium they reside within.

A special kind of wavefield is the Green's function, which represents the wavefield from a specific source point in time and space (or just space in most practical implementations). Many recorded wavefields tend to be a superposition or summation of these Green's functions, weighted by the actual sources of energy in the medium, as well as the sources of scattering (secondary sources). In practice, the wavefields are only known at the sensor (recording device) locations. Thus, a computing device is used to solve for these wavefields (i.e., to determine the structure of the wavefields at locations different from the location of the recording sensor) using (1) an appropriate wave equation (which is selected considering the physical nature of the medium), (2) a given source of energy (location and structure), and (3) the medium's properties through which the waves propagate.

If during the simulation process of the waves, the source and/or the medium's properties are not accurately describing the real source and/or the real medium properties under investigation, the calculated wavefields would usually be departing from the actual wavefields and the calculated values (estimates) at the sensors would be different from those measured during an actual survey. In classic waveform inversion, such differences between the simulated values and the measured values are used to update the source information and/or the medium properties until the differences are minimized. An integral part of this process is the accuracy of the wavefield, which connects these unknowns to the measurements, and often satisfies a particular wave equation, or specifically, its partial differential equation (PDE) form in time or frequency. However, this is a problem for the existing methods as the accuracy of the wavefield is poor in the initial stages of the inversion considering the inaccurate medium properties.

Another problem facing the traditional inversion process is now discussed. Recording waves over time with plural seismic sensors can produce a large dataset, with many events recorded due to (1) active sources of energy (i.e., igniting sources) and/or (2) natural sources of waves, and/or (3) ambient noise. Often, the long time (sometimes days and months) over which the waves are recorded is a cause of increased computational cost for the inversion process as the data residual component of the inversion would have many samples, and span a large space. To reduce such long recording periods and we often use simultaneous sources in a recording session, and thus, have recordings with shot gathers blended. Such blending might be done at the processing stage when dealing with active or natural sources to reduce the data size. In these cases, there would be many events that may be hard to separate or distinguish from each other. Classical update schemes in waveform inversion based on the Taylor's series expansion (referred to as gradient methods), suffer crosstalk and leakage in the inversion if the events are not separated properly. The process of separation is hard and costly, as it will produce a large data space to span the sources for each active or natural or induced event.

Accordingly, there is a need to provide a new inversion process that overcomes the aforementioned deficiencies related to data complexity and crosstalk.

SUMMARY

According to an embodiment, there is a method for partial differential equation inversion. The method includes receiving measured data $d_0$, wherein the measured data is a result of waves being emitted by a source and propagating through a medium; selecting an objective function having first and second measures $N_1$ and $N_2$, wherein the objective function depends on three independent variables V, u, and f, V being a perturbation of a wave equation operator L from a background operator $L_0$, u being a wavefield that satisfies the wave equation operator L, and f being a source function that describes the source of the waves; optimizing with a processor the objective function by finding a minimum or a maximum using the inversion; calculating with the processor solutions V*, u*, and f* of the three independent variables V, u, and f that minimizes or maximizes the objective function; and generating with the processor an image of an object from which the waves are reflected, based on the solutions V*, u*, and f*.

According to another embodiment, there is a method for partial differential equation inversion. The method includes receiving measured data do, wherein the measured data is a result of waves being emitted by a source and propagating through a medium; defining a force function $f_e$ based on three variables V, u, and f, where V is a perturbation of a wave equation operator L from a background operator $L_0$, u is a wavefield that satisfies the wave equation operator L, and f is a source function that describes the source of the waves; selecting a first objective function having first and second measures $N_1$ and $N_2$, the first objective function depending on the wavefield u and the force function $f_e$; optimizing with a processor (800) the first objective function by finding a minimum or a maximum using the inversion; calculating with the processor solutions u* and $f_e$* of the two independent variables u and $f_e$ that minimizes or maximizes the first objective function; selecting a second objective function having the first and second measures $N_1$ and $N_2$, the second objective function depending on the perturbation V and the source function f; optimizing with the processor the second objective function by finding a minimum or a maximum using the inversion; calculating with the processor solutions V* and f* of the two independent variables V and f that minimize or maximize the second objective function; and generating with the processor an image of an object from which the waves are reflected, based on the solutions V* and f*.

According to still another embodiment, there is a method for partial differential equation inversion. The method includes receiving measured data do, wherein the measured data is a result of waves being emitted by a source and propagating through a medium; selecting a Green's function G, which generates estimated data $d_s$ when applied to a source function f, wherein the source function f describes the source of the waves; selecting an objective function having first and second measures $N_1$ and $N_2$, wherein the objective function depends on two independent variables G and f; optimizing with a processor the objective function by finding a minimum or a maximum using the inversion; calculating with the processor solutions G* and f* of the two independent variables G and f so that the objective function is minimized or maximized; and generating with the processor an image of an object from which the waves are reflected, based on the solutions G* and f*.

A computing unit that implements any of these methods is discussed later with regard to FIG. 8. The computing unit has an interface that receives the measured data $d_0$, wherein the measured data is a result of waves being emitted by a source and propagating through a medium, and a processor connected to the interface, which is programmed to implement the steps of the methods discussed above, and/or any of the steps discussed with regard to the figures.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
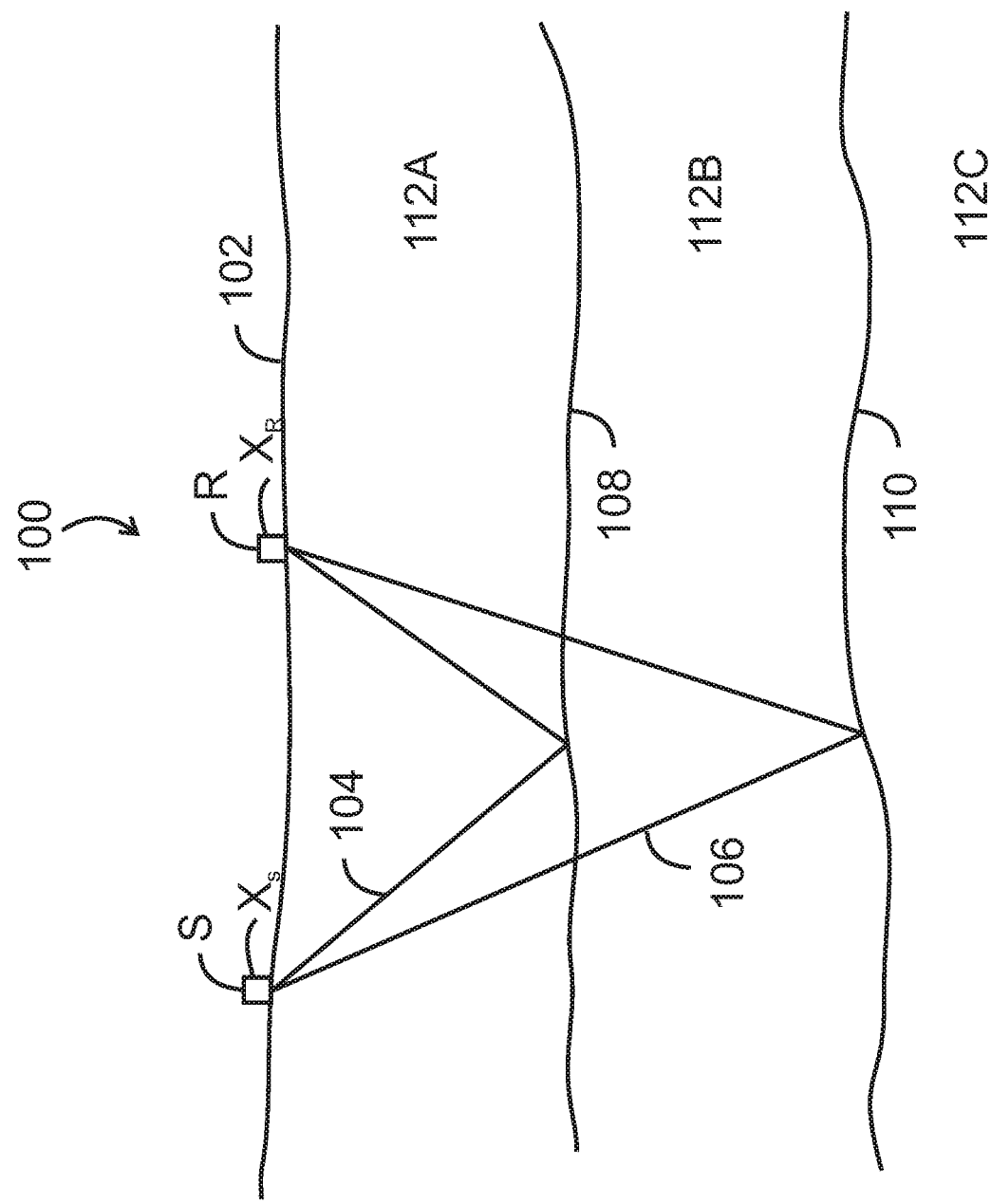
FIG. 1 illustrates a source that generates seismic waves which after getting reflected by the subsurface, are recorded by one or more receivers.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to applying a partial differential equation inversion process to measured seismic data. However, the invention is not limited to seismic data, but it may be applied to any type of data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, the process inverts for all the components of the partial differential equation (PDE) as independent variables note that the PDE is used to describe the propagation of a wavefield through the surveyed medium (e.g., earth subsurface, human body, etc.) used often for computation purposes. Such an inversion might extend the search space considerably. However, such extensions allow for innovative data reductions. The novel process discussed herein utilizes a reduction to invert for the wavefield or Green's function and a new modified source in the background medium. To further make such an inversion less computational intensive and more practical, there is a process of reducing the data space.

Thus, according to another embodiment, there is a method and a process to reduce the data space of the inversion by merging data. By treating the components of the wave equation as independent variables, crosstalk can be avoided. The method is applicable to any active (ignited source for which its locations and time of firing are known) or passive (simply listening for waves generated by sources of wave energy that are not known) wave measurement surveys. This method is also valuable in the case in which the waves are recorded over time and have active or natural sources simultaneously generating the waves, and thus, the recorded signals include energy overlapped from multiple sources. The method is also applicable not only to seismic recorded signals, but also to data that includes signals from medical imaging, seismic inversion and imaging, object detection via radar, nondestructive testing, electromagnetic ground penetrating radar experiments, or any wave type application.

The two components noted above, i.e., the data reduction and the wave equation inversion, though are independent, they benefit from each other when performed together. For example, the data reduction benefits from the wave equation approach, which mitigates the often present artifacts in multi-source inversions, and the inversion benefits from the reduced data space in terms of computational cost reduction.

Prior to discussing the details of these two aspects, the setup of a seismic survey system 100 is schematically illustrated in FIG. 1. This figure shows a land seismic survey system 100 having one source S at the surface 102 of the earth and one receiver R also located at the surface of the earth. Note that the method may also be used for marine environments or any other environment. The measured seismic data $d_0$ includes wavefields (generated by the seismic source S) that propagate through the subsurface, where they are attenuated and reflected, and the attenuated and reflected wavefields u are recorded by the seismic receiver R. FIG. 1 shows one source and one receiver for simplicity. However, the method discussed herein also works for plural sources S distributed over the surface of the earth, or for plural sources being buried under the ground, or plural receivers R being buried under the surface of the earth, or the sources being towed by a vessel in water while the receivers are towed on a streamer spread behind the same vessel or different vessels or the receivers are ocean bottom cables distributed on the ocean's bottom. FIG. 1 also shows that seismic waves 104 and 106 (e.g., sound waves or electromagnetic waves) emitted by the source S are reflected at various interfaces 108 and 110, respectively, in the subsurface. The interfaces 108 and 110 are boundaries between various layers 112A to 112C of the earth.

Figure 2:
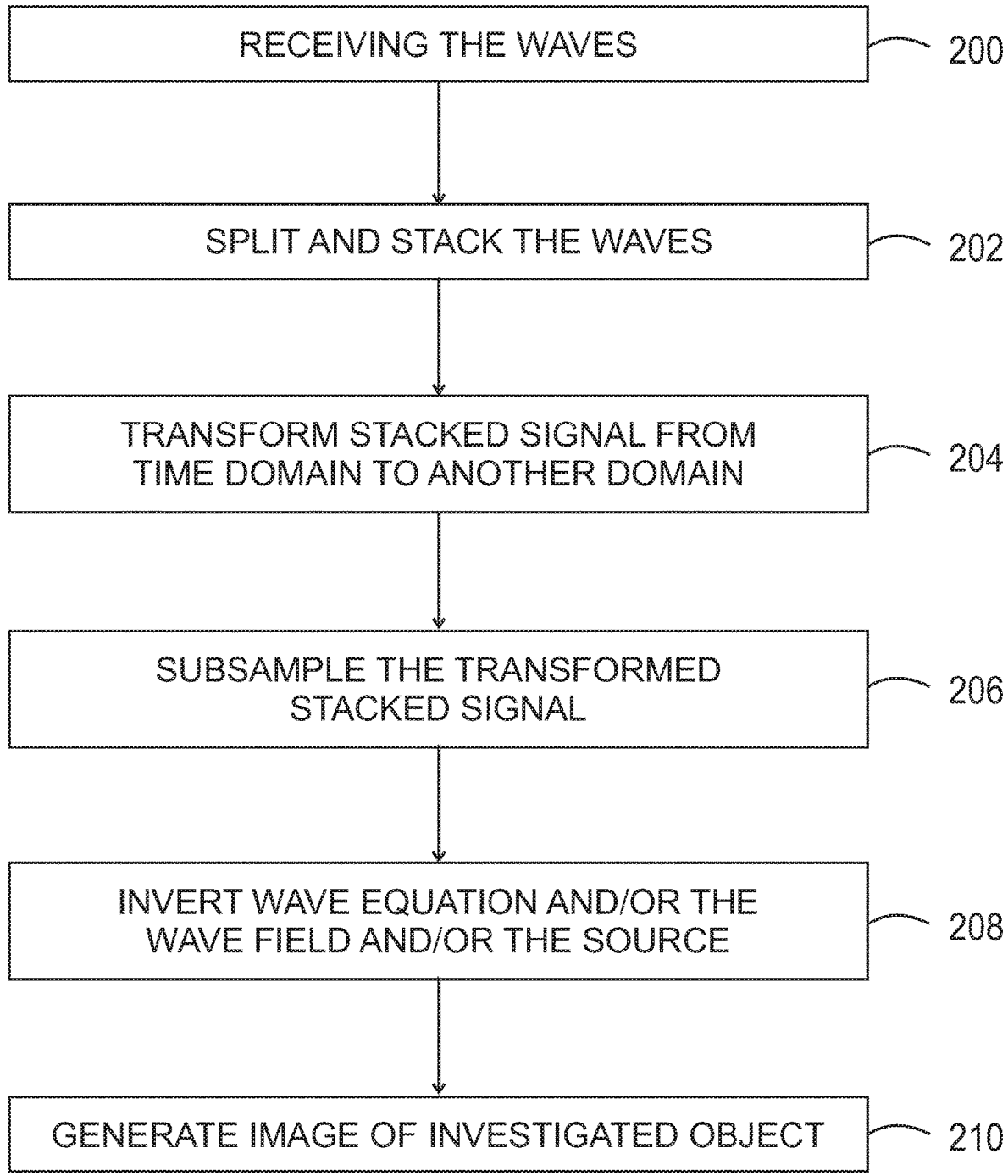
FIG. 2 is a flowchart of a method for generating an image of an object based on waveform inversion.

With this setup, in one embodiment illustrated in FIG. 2, an inversion method includes a step 200 of receiving the recording signals (corresponding to wavefields u). The recorded signals are recorded using the receiver R, which is mounted on the edge of the medium to be investigated, outside such a medium, or within the medium. The receiver may record signals over extended periods of time, for example, every 2 ms.

The recorded signal, which may contain signals from multiple sources, is divided in step 202 over equal or variable time-length segments and these time-length segments are then partially stacked (summed). The summation may be performed with equal or varying weights for each time-length segment.

Alternatively, step 202 may transform the recorded signals to another domain, split the signals in this domain, and then time-reverse the segments obtained from the splitting process (or transformed to an expanded space domain, the medium), using the current knowledge of the medium, and then the segments are stacked (summed), which results in more than one record. Equal or varying weights may be used in the summation process.

In still another variation of step 202, it is possible to select the length of the divided segments to contain time samples compliant with a Fast Fourier transform sampling criterion so no zero padding is needed in the case of Fast Fourier transform. This transform will honor the periodic nature of its Fourier representation. In this variation, events corresponding to certain sources are maintained even if they are divided at the time segment border.

In step 204, the original signal (called trace in the seismic industry) or the stacked (one or many of these signals) signal are transformed to another domain, e.g., the temporal Fourier domain (or any representation of it), in which the signal is represented by base functions that span part or the entire temporal duration of the signal. Thus, in this step, the signal is described by the coefficients of these base functions, including the frequency representation of the signal.

In step 206, the coefficients of the base functions are subsampled, regularly or randomly, with or without averaging or smoothing, over the transformed coordinate, e.g., temporal frequency, with a goal of reducing the number of recorded data points. The temporal equivalence of this step would be to blend seismic events together over time. This step is equivalent to the stack previously mentioned, but in the frequency domain, and this step avoids the problem of having the time segments split some events, and cause artifacts. The periodicity feature of the Fourier representation helps in that matter.

In a variation of step 206, the Fourier transformed signal is partially or fully mapped to its sources in the space domain, prior to stacking or resampling, using any medium property information available to provide an alternative representation of the data.

In step 208, the method applies an inversion to the partial wave equation or parts of it, which includes inverting for the wave equation operator L and/or the wavefield u or the Green's function G and/or the sources f of the wave energy, as independent variables. The inversion uses an optimization problem that minimizes the wavefield difference with the observed data at the receivers and/or minimizes the wave equation lack of compliance with the wave physics (wave equation) of the medium. This optimization step can be performed in the time, frequency, or any other domain in which the data and the wavefields can be represented.

In one variation of step 208, it is possible to invert for the wavefield and/or a modified source $f_e$ that includes the original source and the scattering of the sources. Such an inversion can use a background wave equation operator to constrain the wavefield. In this embodiment, the velocity model provided by the perturbation V in the wave equation operator can be inverted in a separate inversion step.

Alternatively, the wavefield can be used to invert for the medium properties through an optimization problem or direct inversion, which provides for a crosstalk free model.

In still another variation of step 208, the Green's function can be used to invert for the medium's properties, by inverting for the wave equation operator that is capable of satisfying the Green's function. The inversion of the wave equation operator could benefit from some constraints on the physical properties of the medium. In another embodiment, it is possible to invert for the Green's function, the perturbation of the wave operator, and/or the source of wave energy.

The inversion of the above discussed elements may be performed simultaneously or in a nested fashion. Also, the inversion may be applied to one or two or three of the wave equation perturbation, wavefield, and sources. This inversion is immune to cross talk if gradient methods are not used in the inversion for the perturbations. The inversion can be applied in the time (i.e., reduced time) domain or in the frequency domain.

Having performed the inversion, the calculated wavefields u or model m may be used in step 210 to generate an image of the surveyed object, for example, an image of an oil and gas reservoir when seismic data is processed.

The steps presented above with regard to FIG. 2 are now discussed in turn in more detail. With regard to step 202, the property of stacking shot gathers for simultaneous inversion can be effectively reproduced, in the time-space domain, by appending shots to the end of the record of the previous shot for receivers at the same location so that a longer time record is obtained. Then, a Fourier transform is applied to this long record and the Fourier coefficients are subsampled. For example, if five traces corresponding to different shots (but same receiver R) are appended to each other, one long trace is obtained. This long trace is Fourier transformed and the transformed trace is subsampled by five on a regular basis. The result of this process is the summing of the original five traces. The stacked signal accurately represents the features of the earth in the case of separate shot records.

In the case of continuous recording, the process of splitting the record into segments and stacking them faces the possibility of splitting a single seismic event over two segments. Even if variable length segments are used for splitting the record, the possibility of splitting a single seismic event is high as a seismic event often includes a reasonable long trail of coda energy. The Fourier implementation discussed in step 204 avoids such limitation and benefits from its periodicity property.

With regard to step 204, sampling theory describes the critical relation between the present sampling (e.g., every 2 ms for the seismic case) of an otherwise continuous phenomena (or function) and information contained in this sampling. Discrete sampling of functions is used for all computational applications. The Fourier representation explains the limits of the sampling operation in terms of the Nyquist frequency (or the frequency upper limit considering the discretization in time of a measured phenomenon). Equivalently, the maximum recording time controls the sampling of frequencies.

For example, a long seismic recording of a conventionally sampled wavefield (4 ms) will result in a fine sampled frequency representation within a classic range of frequencies. As the fine sampling of frequencies is necessary to pin down the time characteristics of events over the long (days) recording time, and because the method inverts a domain of interest, which is of a conventional size, there may be no need for the fine sampling in frequency. Also, for the conventional frequency range (3-10 Hz) of seismic acquisition, frequency groupings of 0.2 Hz range have almost identical wave propagation features.

Based on sampling theory, the Nyquist frequency is given by the following formula:

$$f_{Nyq} = \frac{1}{2\Delta t}, \qquad (1)$$

where $\Delta t$ is the sampling interval in time. On the other hand, the frequency sampling interval is given by $$\Delta \omega = \frac{4\pi f_{Nyq}}{n_t}, \qquad (2)$$

where $n_t$ is the number of samples in time including any padding. A binning of frequencies over larger frequency sampling to $\Delta\omega_{bin} \gg \Delta\omega$ will result in the corresponding $n_t$ being much smaller than the number of recorded samples. Because $\Delta t$ has not changed, this process effectively suppresses all the events recorded over the long listening time and within the space domain of interest, to a short time window allowing for simultaneous source inversion. This is possible because one aim of the methods discussed herein is the inversion process, not the timing of the events. Thus, the process now becomes like a simultaneous source inversion, susceptible to all the limitations that this process might bring, including crosstalk.

This process of reduced time can be implemented in many ways. It can be applied to separate shot records or to passive listening. In all cases, the concept is based on splitting the time record into segments and then summing these segments. For this embodiment, the method does not track the true time of the seismic events, and as such, the time axis is a dimension of little value. Because the objective of this embodiment is determining the static properties of the surveyed medium, the method transforms such time series to their Fourier representation. In one application, a Fast Fourier transform (FFT) is used so that the segments are compliant with the sampling needs of the FFT, thus avoiding any zero padding. This approach maintains the periodicity of the Fourier transform representation without any gaps.

An example of reducing the data is now discussed. Consider a time series (trace) d of length n. This trace is divided into segments $d_i$ of length l, where l<<n. In this case, l is preferred to be of length 2m, where m is any integer between 1 and a reasonable number. The last segment, which does not divide rationally over l, can be padded with zeros to make it have the length l, or otherwise it can be summed directly without padding. To mitigate the time dimension, which has now no meaning, a Fourier transform is applied to the stacked section to transform it to the temporal frequency domain as follows:

$$F(\omega_j) = FFT\left(\sum_i d_i\right). \qquad (3)$$

If the stacked segments contain many seismic events, the frequency representation (especially each frequency, $\omega_j$) might be too small to distinguish the events. This is relevant to the inversion process because the inversion process often uses a limited number of frequencies in the frequency domain. Later on, an approach to map the data to its temporary sources using the initial information of the wave equation operator, and the wavefield or Green's function, is discussed. This method is referred to as "time-reversal," and a "MapTospace" operator is used herein to describe it. In this case, the limited receiver domain (i.e., the data recorded by the plural seismic receivers) is extended to the medium domain (i.e., the wavefields that propagate along various paths, from the sources to the receivers, through the earth medium), which is often much larger. The process is described by:

$$F(x, \omega_j) = \sum_i MapTospace(FFT(d_i)), \qquad (4)$$

where x represents the space coordinate and the MapTospace operator transforms the receiver data, one frequency at a time, to the source field, based on the wave equation. Thus, this operator may be, for example, the wave equation or its inverse. Those skilled in the art know that there are many wave equations that can be used to describe the medium. In this case, it is possible to keep as few frequencies as needed by the inversion.

Another approach is to Fourier transform the full series and then chose as few frequencies as needed for the inversion. In this case, the inversion is simply:

$$F(\omega_j) = FFT(d). \quad (5)$$

However, in choosing the frequencies for the inversion, the method faces the same issue with regard to the limited space of the sensor domain (the data). No information has been lost in the process as it is possible to inverse Fourier back the data using the full span of Fourier coefficients, which could be a large amount in this case. Thus, in the mapping, according to an embodiment, a number of frequencies are simultaneously used as follows:

$$F(x, \omega_j) = \sum_k MapTospace(FFT(d)[\omega_k]), \quad (6)$$

where k is the number of frequencies $\omega_k$ used in the mapping and it is proportional to the reduction in the data space over time.

Step 208 of the method illustrated in FIG. 2 is now discussed in detail. This step may be implemented in various ways. Each way is discussed with regard to its corresponding flowchart. Prior to discussing the novel implementations of step 208, a traditional implementation of such step is first presented.

The conventional waveform inversion process finds a model m* and a source function r by optimizing a measure (e.g., a distance or a norm) between the recorded data $d_0$ and the estimated data $d_s$. Note that the "*" notation means a solution of a given quantity. The recorded data $d_0$ are data recorded with any receiver, for example, seismic sensors in this example. The estimated data $d_s$ are calculated based on the source function f and the model m. In this regard, the source function f is a function which describes the behavior of a source. For example, for an airgun that is used in a marine seismic data acquisition system, the source function f describing the source can be considered as a Delta Dirac function in space. However, other functions may be used for describing the source. The model m is a function or vector that contains medium properties and used to generate the estimated data that we hope will look like the measured data. The model m* and source function f* are mathematically determined by solving the following equation:

$$(m^*, f^*) = \text{optimize } [d_0, d_s(m, f)], \quad (7)$$

such that $d_s$=forward[m](f), where the operator "optimize" stands for some minimum or maximum of a functional formed to express some measure of similarity or difference of the quantities (data vectors) in the square brackets separated by comma, and the expression within the square brackets is referred to as the objective function. In this case, the operator optimize includes some measure of misfit or similarity between the recorded data $d_0$ or any representation of it, like phase, Fourier basis, and the modeled data $d_s$ or any version of it obtained using the operator "forward." The forward operator may be the forward extrapolation (modeling) of the wavefield applied, using the model in square parenthesis, in this implementation, to the quantity in the circular parenthesis, i.e., the source function f. The modeled data are linear with respect to the source function f, but not with respect to the model, m. Thus, the forward extrapolation operator depends on the model m. Therefore, the output of the operator "optimize" are the solutions for the model m and source function f.

The linearized (or quadratic) update of the model m and the source function f are given by:

$$m=m+\Delta m \text{ and/or } f=f+\Delta f$$

such that $(\Delta m, \Delta f) = \text{inverse}[m](f). \quad (8)$

The operator "inverse" can include the gradient of the objective function with respect to the model m and source function f as well as the inverse Hessian or any approximation of it, as well as it may include a scalar variable extracted through a line search. The "inverse" operator, like the "forward" operator, uses the model m (in brackets) to map the residuals given by the data (in parenthesis). Conventional representations of the "optimize" operator can cause the inversion process to suffer from a high-level of nonlinearity between the data and the perturbations in the model. For blended and simultaneous seismic surveys, where two or more sources emit energy at the same time, it also results in cross-talk and artifacts in the gradient and thus, the result.

The optimization problem of equation (7) can be rewritten, by introducing the wavefield u. First, the estimated data is given by $$d_s = Cu, \quad (9)$$

where C is a projection operator that extracts from the wavefield u its value at the sensors' location. Second, using equation (9), the optimization problem becomes, $$(V^*, f^*) = \text{optimize}[N[d_0, Cu]] \text{ such that } (L_0+V)u=f, \quad (10)$$

where N is a measure (e.g., distance) operator or norm operating in any space including the Euclidean, the Hilbert, or the Sobolev spaces or any other. The measure N could also include a correlation or deconvolution and could be normalized, and within the operator "optimize" it can represent addition or multiplication, and operator V is the perturbation of the wave equation operator from a background operator $L_0$. In solving for V and because the optimization is directly related to the data fitting, the update of the solution in equation (10) by using, for example, the adjoint state method, yields a cross-correlation between wavefields (state and adjoint state) vulnerable to crosstalk in the case of multi sources.

For the optimization of equation (10), the linearized update of the solutions is given by:

$$V=V+\Delta V \text{ and/or } f=f+\Delta f$$

such that $(\Delta V, \Delta f) = \text{inverse}[V, f](N[d_0, Cu]). \quad (11)$

The update of the perturbation V in the wave equation operator for this approach amounts to conventional waveform inversion.

Figure 3:
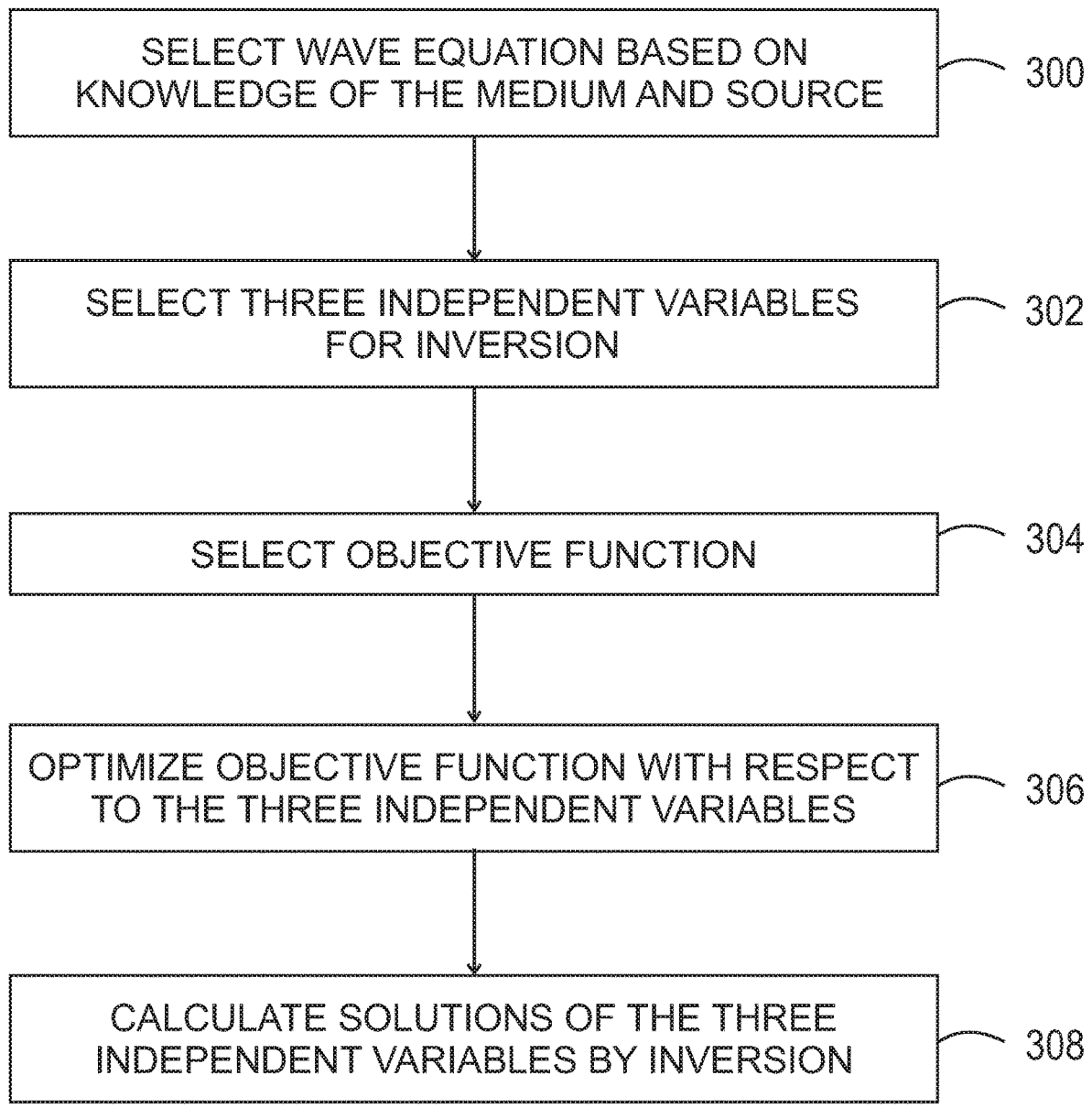
FIG. 3 is a flowchart of a method for performing waveform inversion based on three independent variables.

A novel inversion approach is now presented with regard to FIG. 3. This inversion starts in step 300 with selecting an initial wave equation corresponding to an initial knowledge of the medium, an initial knowledge of the physics of the medium, and an initial knowledge of the source. These could be guesses and/or could be based on using other approaches to obtain the initial values. Then, the process updates one or more of the components, in any order or together, as now discussed.

According to this method, an extended formulation of the optimization may be used. In this implementation, an inversion for the wave equation operator, as a component in the optimization, is used in addition to the inversion for the wavefield u and the source function f. Thus, step 208 includes selecting in step 302 three independent variables for the inversion process, (1) a perturbation V of the wave equation, (2) the wavefield u, and (3) the source function f. In step 304, an objective function is selected and an optimization problem is set:

$$(V^*, u^*, f^*) = \text{optimize}[N_1[d_0, Cu] \text{ and } N_2[(L_0 f + V)u, f]], \quad (12)$$

where V is the perturbation of the wave equation operator from a background operator $L_0$. The objective function, in this specific implementation, is selected to have first and second measures $N_1$ and $N_2$, and depends on the three independent variables V, u, and f. In step 306, the objective function is optimized with regard to the three selected independent variables. Solving equation (12) for the perturbation V, the multi-source reduced time wavefield is filled with events helping to make a proper determination of the wave equation operator. Measures $N_1$ and $N_2$ of the objective function may be the same as measure N in equation (10). In one application, measures $N_1$ and $N_2$ may represent different measures of difference and/or similarity and they may be differently scaled.

The solutions V*, u*, and f* are iteratively calculated in step 308 using linearized updates for equation (12), which are given by:

$$V = V + \Delta V \text{ and/or } u = u + \Delta u \text{ and/or } f = f + \Delta f,$$

such that $(\Delta V, \Delta u, \Delta f) = \text{inverse}[V, u, f](N_1[d_0, Cu]$ and $N_2[(L_0 + V)u, f])$, (13)

until a minimum or maximum of the objective function is found. Note that for each iteration, each independent variable is updated with a corresponding linear update, which may be calculated, for example, by a gradient method. The linear updates are obtained in equation (13) by satisfying the constraints imposed by the two measures $N_1$ and $N_2$.

The update of the perturbation V for the wave equation operator may include multiplications and/or correlations of the wavefields, and thus, it is vulnerable to cross-talk when multiple sources are present. In this embodiment, although the perturbation V may have a general form, for practical applications, it has zero valued elements beyond the wavefield and source function spaces, or it needs to have a similar dimension. In this form, the objective function has three independent parameters, and a tradeoff between the three independent variables may exist, especially between variables V and f. Thus, constraints are needed and recommended in this case. If the perturbation V is evaluated directly from the wave equation, it is possible to avoid the cross-talk. Once the three independent variables are calculated, the method returns to step 210 for generating the image of the surveyed object.

Figure 4:
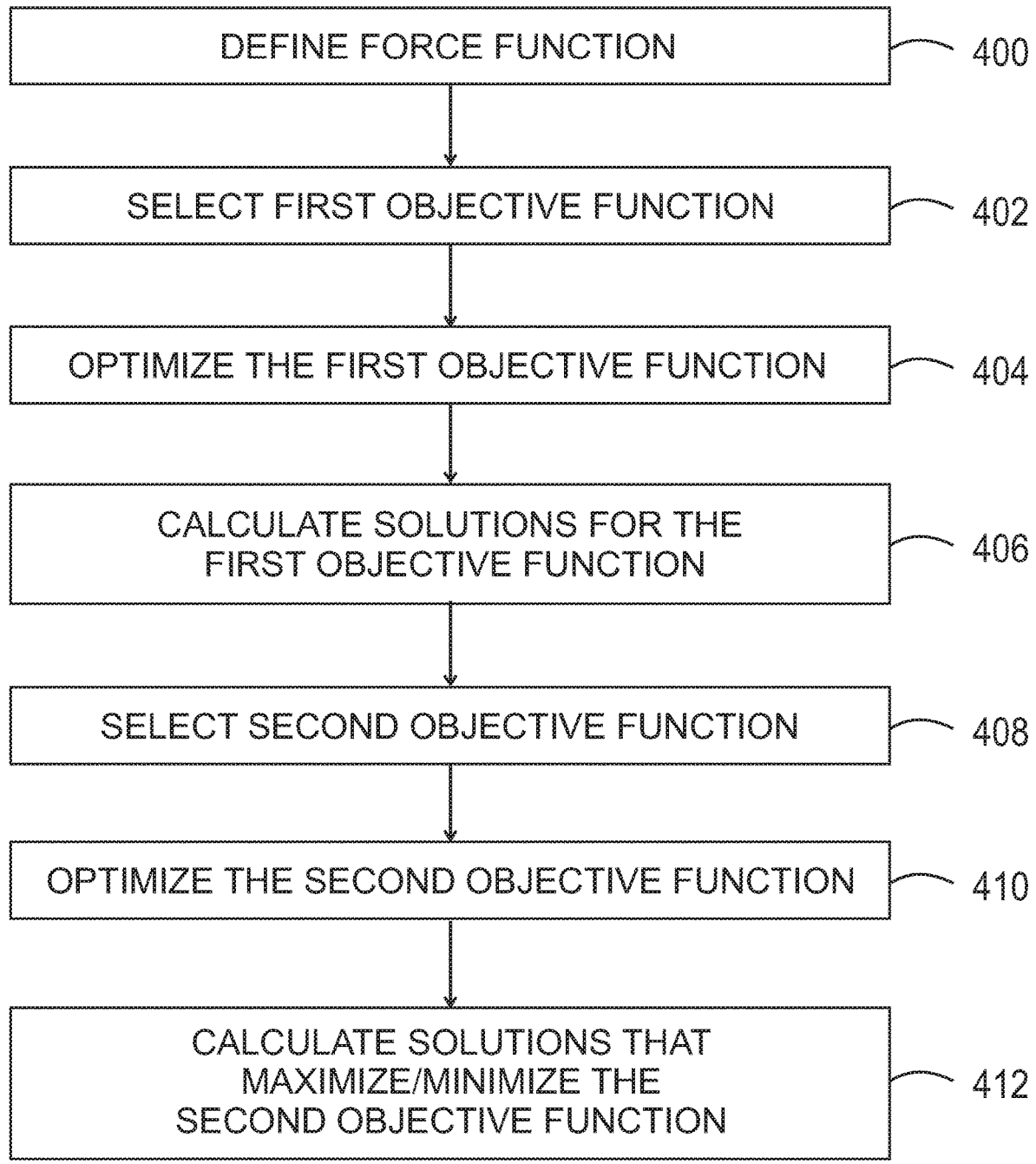
FIG. 4 is a flowchart of a method for performing waveform inversion using a force function.

Another approach to reduce the tradeoff between the independent variables and mitigate the crosstalk is to define in step 400, according to an embodiment illustrated in FIG. 4, a new quantity, the force function $f_e$ that includes both the perturbation V and the source function f, and thus, avoid directly updating the perturbation V. The force function $f_e$ represents, in addition to the true source or sources, a secondary source, i.e., an underground point where the seismic waves are reflected or refracted. The seismic waves are originally emitted by a primary source (e.g., a vibrator or an air gun), and while the waves propagate through the subsurface, they experience reflections and/or refractions at various points. These points can be mathematically considered to be secondary sources for the wavefields. The force function $f_e$ describes, as well, such a secondary function. For example, in one application, the force function $f_e$ may be defined as, $f_e = f - Vu$, or as a measure $N_2$ between the source function f and the perturbation V applied to the wavefield u:

$$f_e = N_2[Vu, f]. \quad (14)$$

In step 402, a first objective function is selected. For this embodiment, the first objective function is described by measures $N_1$ and $N_2$, where the first measure evaluates a "distance" between the measured data $d_0$ and a projection C of the wavefield u, and the second measure $N_2$ evaluates a "distance" between the force function $f_e$ and the result of the application of the background operator $L_0$ on the wavefield u. With this selection of the force function and the first objective function, the method optimizes in step 404 the first objective function as indicated by:

$$(u^*, f_e^*) = \text{optimize}[N_1[d_0, Cu] \text{ and } N_2[L_0 u, f_e]]. \quad (15)$$

In step 406, the method calculates the solutions u* and $f_e^*$ using the linearized updates of the wavefield and the source function through the inversion operation, which is given by:

$$(\Delta u, \Delta f_e) = \text{inverse }[u, f_e](N_1[d_0, Cu] \text{ and } N_2[L_0 u, f_e]) \quad (16)$$

and calculates the updated values for the wavefield and force function:

$$u = u + \Delta u \text{ and/or } f_e = f_e + \Delta f_e.$$

In this type of update, the force function represents the actual source and its perturbations (i.e., the secondary sources discussed above). Knowledge of the true source or penalties applied to it can be used to resolve for V and/or f. Another interesting feature is that the inversion for u and/or $f_e$ is linear, which implies that the first objective function is convex and the convergence of the calculations are guaranteed if no Null space is encountered. It also means it can be simplified, as discussed next.

A second objective function is selected in step 408 based the perturbation V and the source function f. The second objective function uses the two measures $N_1$ and $N_2$, which are nested in this case, i.e., the second measure estimates a distance between (a) the product of the perturbation operator V and the wavefield u, and (b) the source function f, and the first measure estimates a distance between the force function $f_e$ and a result of the second measure. The optimization of the second objective function is performed in step 410:

$$(V^*, f^*) = \text{optimize}[N_1[f_e, N_2[Vu, f]]], \quad (17)$$

and this equation can be used to find V and f with some constraints needed to either find one of them considering the other is known. By using a second inversion in step 410, the linearized update of the perturbation V and the source function f are calculated in step 412, as described by:

$$(\Delta V, \Delta f) = \text{inverse } [V, f](N_1[f_e, N_2[Vu, f]]), \quad (18)$$

and the perturbation and the source function are updated with the linearized updates as follow:

$$V = V + \Delta V \text{ and/or } f = f + \Delta f.$$

The gradient approach for this optimization might yield cross-talk. However, considering the reduced space, it is possible to employ a global optimization localized. For example, it is possible to search for V that will eventually fit the objective function. Note, that no modeling is required here so the global optimization is efficient. It also can be solved via stable deconvolution, or in the frequency domain by a stable division if either f or V is known, so that:

$$V = \frac{(f_e - f)}{u} \text{ or } f = f_e - Vu. \tag{19}$$

Such inversion offers artifact free solutions of the medium parameter perturbations V.

In another embodiment of the inversion, which is preferred in the frequency domain, the data are mapped (see equation (4) and associated discussion) to the space domain (e.g., using the wave equation) prior to the reduction operation. Because the frequency domain representation for a single frequency in the reduced space, with many recorded events, has a limited span requiring utilization of many frequencies. An alternative is provided by representing the data in the space domain, by time reversal, using the current (initial) knowledge of the medium and the physics of it. Such a process needs to be applied prior to the stacking process. Alternatively, such a process can be implemented by utilizing a range of frequencies in the Fourier domain.

One option for the case of continuous recording is to divide the data into equal time segments with sampling favorable to FFT. Then, these segments are Fourier transformed to the frequency domain. Next, map a single frequency data from each segment to its source in the space domain, using the current knowledge of the medium properties and the corresponding wave equation. For that single frequency, stack the space domain sources and then utilize the stacked sources in a single frequency inversion. Mathematically, this method can be expressed as:

$$(f_i) = \text{inverse}[G_0](d_i)$$

where $d_i$ corresponds to the data segments in frequency domain (for a single frequency) and $f_i$ is the resulting source function. Here, $G_0$ is Green's function for the background medium $L_0$. Thus, the objective function for this embodiment depends on two variables, the Green's function and Vo. Next, the method sums the source functions:

$$f = \sum_i f_i.$$

In this case, equation (15) becomes:

$$(u^*, f_e^*) = \text{optimize}[N_1[CG_0 f_0, Cu] \text{ and } N_2[L_0 u, f_e]], \tag{20}$$

where $G_0$ is the background Green's function. The resulting update is given by $$u = u + \Delta u \text{ and } f_e = f_e + \Delta f_e,$$

where the linearized updated are given by:

$$(\Delta u, \Delta f_e) = \text{inverse}[u, f_e](N_1[CG_0 f_0, Cu] \text{ and } N_2[L_0 u, f_e]). \tag{21}$$

Similar substitutions and extensions apply to the other objective functions for the extended data space.

Figure 5:
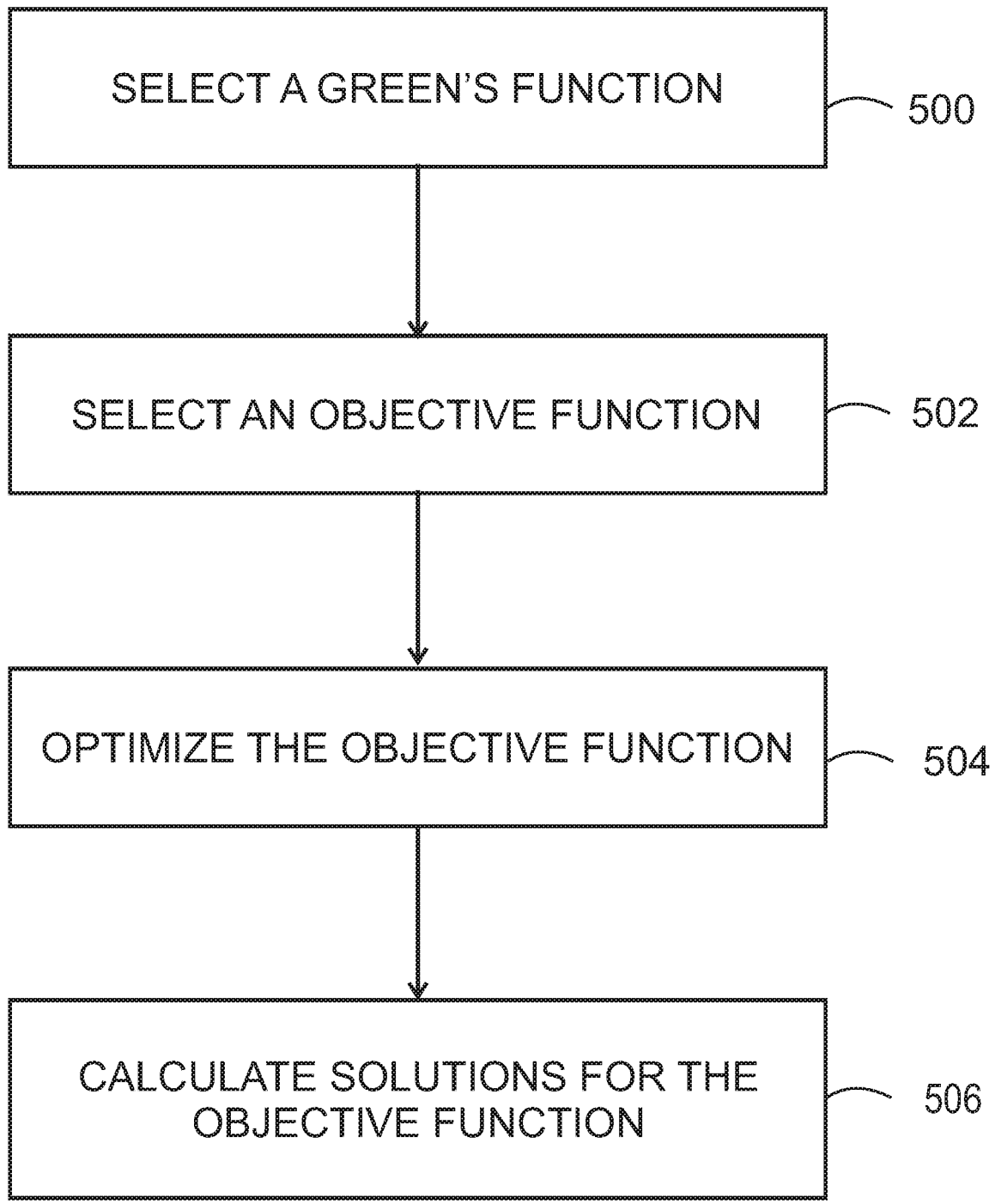
FIG. 5 is a flowchart of a method for performing waveform inversion using a Green's function.

The approach discussed in the embodiment illustrated in FIG. 4 may be generalized by utilizing a Green's function G instead of the wavefield u. This new approach is discussed with regard to FIG. 5. In this embodiment, a Green's function G is selected in step 500 so that it generates the estimated data $d_s$ when applied to a source function f. The "forward" operator is defined as being a linear process that uses the Green's function G. With this definition, the estimated data $d_s$ becomes:

$$d_s = CGf, \tag{22}$$

in which the wavefield u was replaced by the Green's function G. In this embodiment, the Green's function is the inverse of the wave equation operator, $L = L_0 + V$, such that $LG = I$, with I being the identity matrix. The projection operator C, as previously discussed, extracts the part of the wavefield at the receivers. An objective function is selected in step 502. The objective function uses two measures, the first measure $N_1$ estimating a distance between the measured data $d_0$ and the estimated data $d_s$, where the estimated data is calculated by applying the Green's function on the source function f and then the projection operator C, and the second measure $N_2$ estimates a distance between the product of the wave equation operator and the Green's function, and the identity matrix. An optimization problem is set up in step 504 for the objective function, which uses the Greens' function instead of the model parameters, and the source function f as follows:

$$(G^*, f^*) = \text{optimize}[N_1[d_0, CGf] \text{ and } N_2[LG, I]] \text{ such that } L = G^{-1}, \tag{23}$$

where the model parameters can then be extracted from the Green's function G.

Solving equation (23) by any known method, for example, gradient method, the gradient (also referred to as linearized update) of the Green's function and the source function is given by:

$$(\Delta G, \Delta f) = \text{inverse}[G, f](N_1[d_0, CGf] \text{ and } N_2[LG, I]) \tag{24}$$

and the Green's function and the source function are updated in step 506 with the values calculated with equation (24) as follows:

$$G = G + \Delta G \text{ and/or } f = f + \Delta f.$$

In this form, the wave equation operator L can be extended beyond the wavefield space, to the Green's function space. This extended space allows for the inversion of the physics that may help explain the data and that includes anisotropy, elasticity, viscoelasticity or any other phenomena.

If the wave equation operator is included in the objective function, an optimization problem can be formulated for the wave equation operator L as well as the Green's function and the source function, instead of the model parameters, as follows:

$$(L^*, G^*, f^*) = \text{optimize}[N_1[d_0, CGf] \text{ and } N_2[LG, I]], \tag{25}$$

where the model parameters can then be extracted from the Green's function.

Equation (25) can be solved, for example, with the gradient method, to calculate the gradient of the three independent variables i.e., $$(\Delta L, \Delta G, \Delta f) = \text{inverse}[L, G, f](N_1[d_0, CGf] \text{ and } N_2[LG, I]). \tag{26}$$

Then, the three independent variables are updated with the linearized updates as follow:

$$L = L + \Delta L \text{ and/or } G = G + \Delta G \text{ and/or } f = f + \Delta f$$

In this case, the wave equation operator L can be constrained to an assumption about the medium, and thus, the linearized updates apply to the reduced form, like the wavefield space components (diagonal in a one-dimensional space) with updating corresponding to the velocity. This can again be represented by the perturbation V with the modified optimization:

$$(V^*, G^*, f^*) = \text{optimize}[N_1[d_0, CGf] \text{ and } N_2[(L_0 + V)G, I]], \tag{27}$$

where the model parameters can then be extracted from the Green's function.

Equation (27) can be solved, for example, with the gradient method, to calculate the gradient of the three independent variables of equation (27), i.e., $$(\Delta V, \Delta G, \Delta f) = \text{inverse}[V, G, f](N_1[d_0, CGf] \text{ and } N_2[(L_0+V)G, I]). \quad (28)$$

Then, the three independent variables are updated with the linearized updates as follows:

$$V = V + \Delta V \text{ and/or } G = G + \Delta G \text{ and/or } f = f + \Delta f.$$

The perturbation operator V here can also be restricted by some assumption about the medium or allowed to be more general.

According to still another embodiment, a more natural optimization for the Green's function utilizes the Lippmann-Schwinger equation and has the following form:

$$(V^*, G^*, f^*) = \text{optimize}[N_1[d_0, CGf] \text{ and } N_2[G, G_0 + G_0 VG]], \quad (29)$$

where V is the perturbation of the wave equation operator L from a background operator $L_0$. Thus, the Green's function for the background $G_0$ is given by $L_0 G_0 = I$.

Equation (29) can be solved, for example, by inversion to calculate the gradient of the three independent variables as follows, $$(\Delta V, \Delta G, \Delta f) = \text{inverse}[V, G, f](N_1[d_0, CGf] \text{ and } N_2[G, G_0 + G_0 VG]). \quad (30)$$

Then, the three independent variables are updated with the linearized updates as follows:

$$V = V + \Delta V \text{ and/or } G = G + \Delta G \text{ and/or } f = f + \Delta f.$$

Here, the update of V is prone to cross-talk, but the cross-talk is less severe as the update corresponds to residuals in the Lippmann Schwinger equation, rather than the data, which is an extended form. If the residual Green's function is small, the chance for cross-talk diminishes. The wave equation operator, which contains the medium information, can then be evaluated from equation $L = L_0 + V$. If the perturbation V is not restricted to adhere to a specific medium's assumption, it can be used to help project the inversion result to the nearest medium assumption that may explain the system, like anisotropic, dispersive and so on.

In another embodiment, the Lippmann-Schwinger equation can be inserted in both measures $N_1$ and $N_2$ of the objective function. For this formulation, and also when using the equation u=Gf, the optimization problem for the objective function can be rewritten as:

$$(V^*, u^*, f^*) = \text{optimize}[N_1[d_0, CG_0 f + CG_0 Vu] \text{ and } N_2[u, G_0 f + G_0 Vu]], \quad (31)$$

which is similar to equation (29). Equation (31) can be modified using the reduction formulation for the force function $f_e$:

$$f_e = N_2[Vu, f] \quad (32)$$

to achieve:

$$(u^*, f_e^*) = \text{optimize}[N_1[d_0, CG_0 f_e] \text{ and } N_2[u, G_0 f_e]], \quad (33)$$

where the Green's function for the background $G_0$ is given by $L_0 G_0 = I$. This formulation is similar to that expressed by equation (15).

By solving equation (33), the gradient of the two independent variables is given by:

$$(\Delta u, \Delta f_e) = \text{inverse}[u, f_e](N_1)[d_0, CG_0 f_e] \text{ and } N_2[u, G_0 f_e], \quad (34)$$

and the updated variables are given by:

$$u = u + \Delta u \text{ and/or } f_e = f_e + \Delta f_e.$$

In this embodiment, the evaluation of V is achieved using equation (32) as illustrated earlier, and such an evaluation could be free of crosstalk.

The structure of the wave equation operator L in its functional or discrete form is tied to the physical properties of the wave while propagating in the medium. Many features of the wave, like frequency, control the values within L but also, more importantly, L is controlled by the medium's properties in which the wave propagates. Inverting for L is often equivalent to inverting for the medium's properties under a certain assumption of the medium. In this embodiment, it was assumed that the expansion of the inversion is free of medium constrains.

In another embodiment, the Green's function or the wavefield can be used to invert for the medium's properties that explain the wave propagation and the wavefield. For example, it is possible to set up an optimization problem to invert for $L = L_0 + V$ as follows:

$$(V^*) = \text{optimize}[N[(L_0+V)G, I]]. \quad (35)$$

Then, the inverted V* is projected to $V_{medium}$ using any of the many projection approaches available.

The above discussed optimizations can be implemented in the time or frequency domain. However, the frequency domain allows for a more confined representation of the wavefield and Green's function. While the wavefield in this representation has dimensions of the model space multiplied by any split of the data (like sources in active experiments), the Green's function has dimensions of the model space squared. One feature of the optimizations presented herein is that no inverse is required for any variable.

Next, steps 202, 204, and 206 of the method of FIG. 2 are briefly discussed. Note that these steps may be applied to any of the methods discussed with regard to FIGS. 3-5. In these steps, the data are reduced by subsampling. The reduction in data is illustrated herein with regard to FIGS. 6 to 7B, using the Fourier transform approach. One approach is to divide the data into equal segments and then stack the segments (step 202). However, to utilize the Fourier domain and its periodic property, it would be better to divide the data into equal segments of a Fast Fourier transform (FFT) having a preferred sample length, to avoid the need for zero padding, and utilize the efficient properties of FFT. The implementation of the inversion in the frequency domain is expected to honor the periodic nature of this segmentation process, and thus, provide a reliable inversion.

Figure 6:
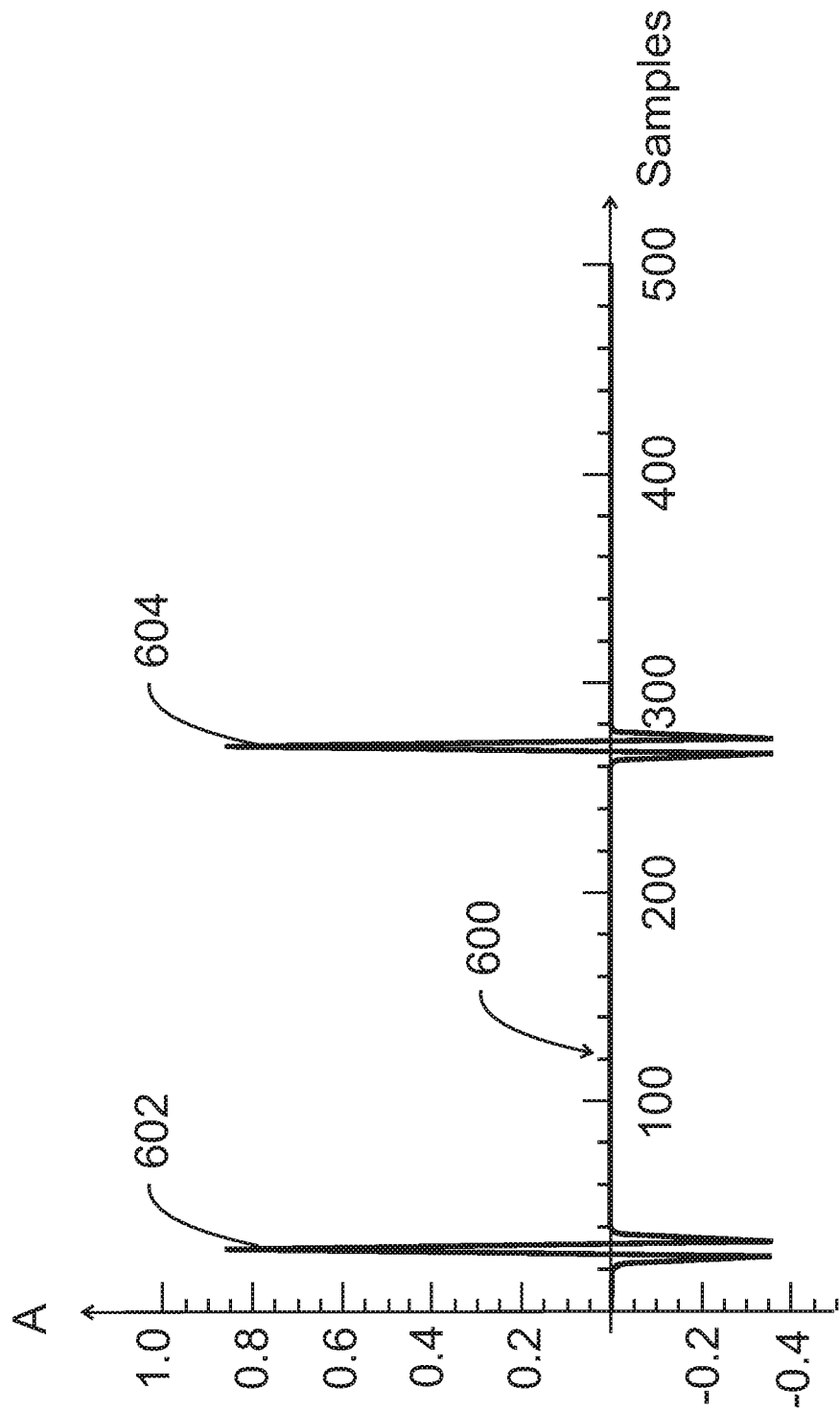
FIG. 6 illustrates a trace in a time-space domain.
Figure 7A:
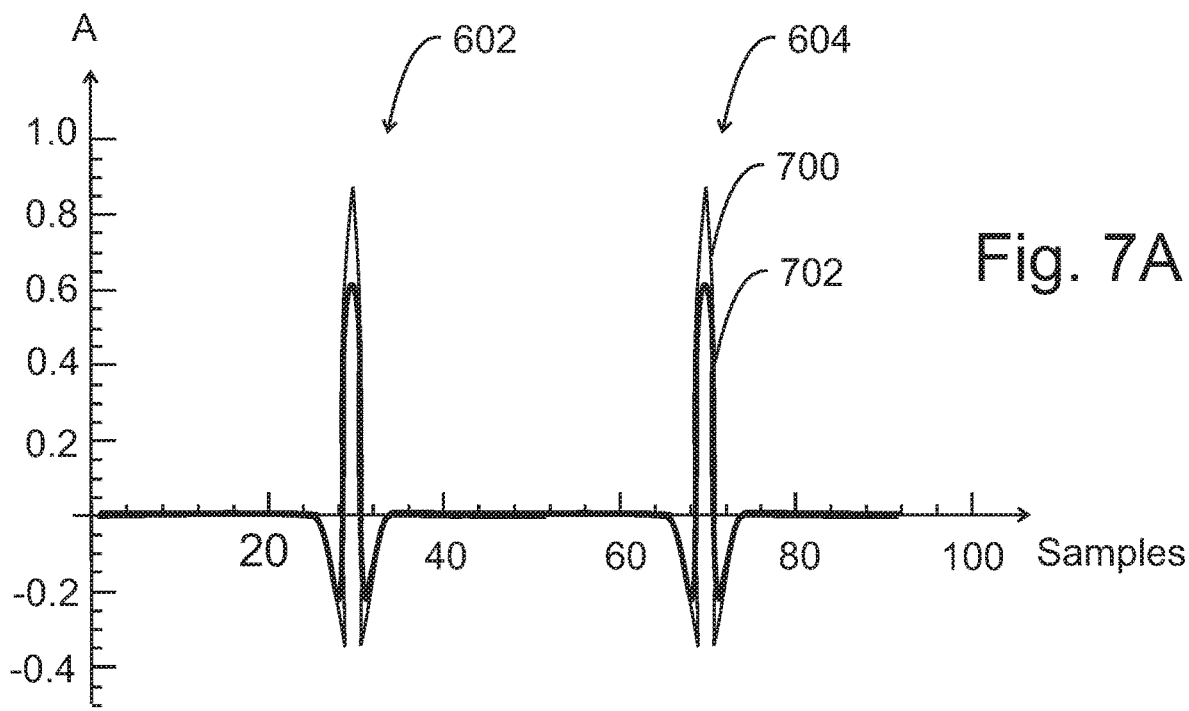
FIGS. 7A and 7B illustrate a subsampled trace.
Figure 7B:
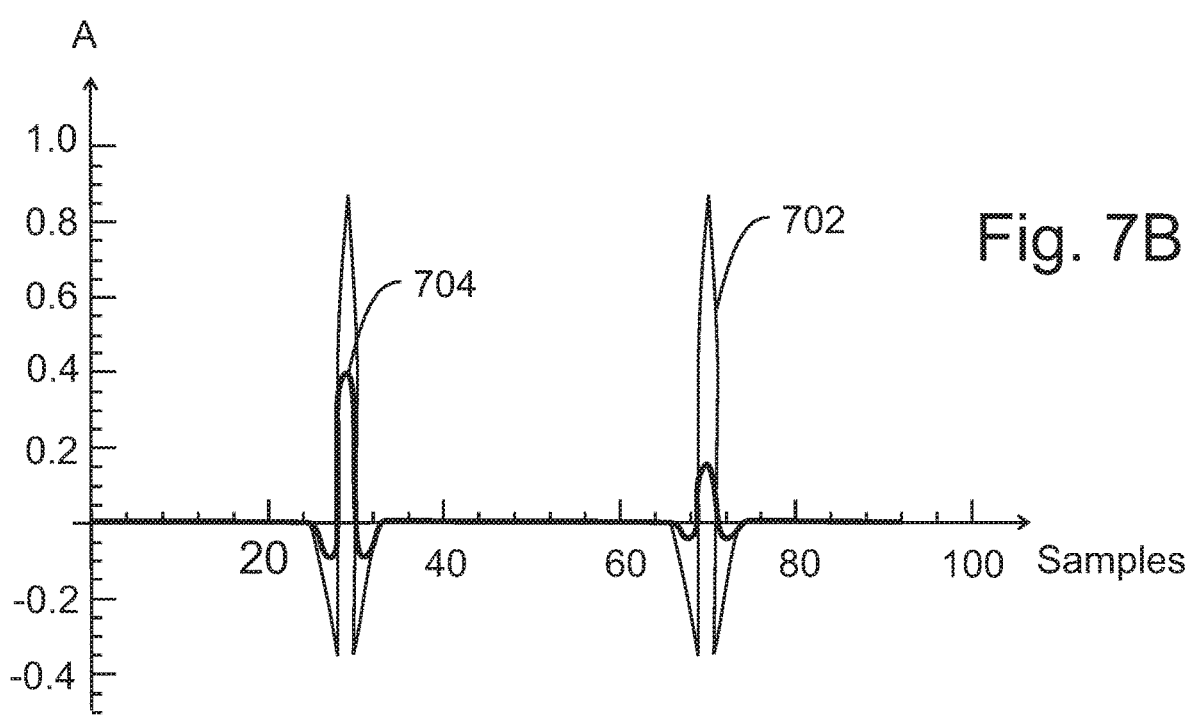

The frequency domain equivalency demonstrates some of the features of sampling theory. FIG. 6 shows a trace 600 that has 500 samples (the length of the trace in terms of samples is shown on the X axis) with two potentially recorded events 602 and 604, at samples 25 and 275, respectively. Note that the Y axis of the graph in FIG. 6 shows the amplitude of the events. For example, if the measured event is a seismic pressure under water, a hydrophone may be used to measure water pressure changes, which are associated with the seismic events. Thus, trace 600 shows two events at samples 25 and 275, and no activity at all other samples. An application of the Fourier transform (step 204) to these recorded events (measured data $d_0$) provides the equivalent frequency representation of this trace. Then, the method subsamples (steep 206) the transformed data in terms of its frequency representation by a given number, for example 5, which implies that the method is reducing the data space by 5 fold. Thus, the time domain equivalent of the data $d_0$ is shown in FIG. 7A as a 100-sample trace 700 containing the two events 602 and 604 mapped into the reduced space. In this embodiment, trace 700 is a trace obtained by dividing the 500-sample trace 600 in FIG. 6 into 5 equal segments, stacking them, and then inverse Fourier transforming the stacked segments. If it is desired to smooth the frequency representation of the trace 700 in the frequency domain by a 5-point smoother prior to resampling, the method Fourier transforms the data shown in FIG. 6, smooths it by a window of 5 samples in the Fourier domain, subsamples the data, and then inverse Fourier transforms the data to achieve the effect of attenuating the samples as a function of arrival time as illustrated by trace 704 in FIG. 7B, which may have its own advantageous features during a waveform inversion process.

Figure 8:
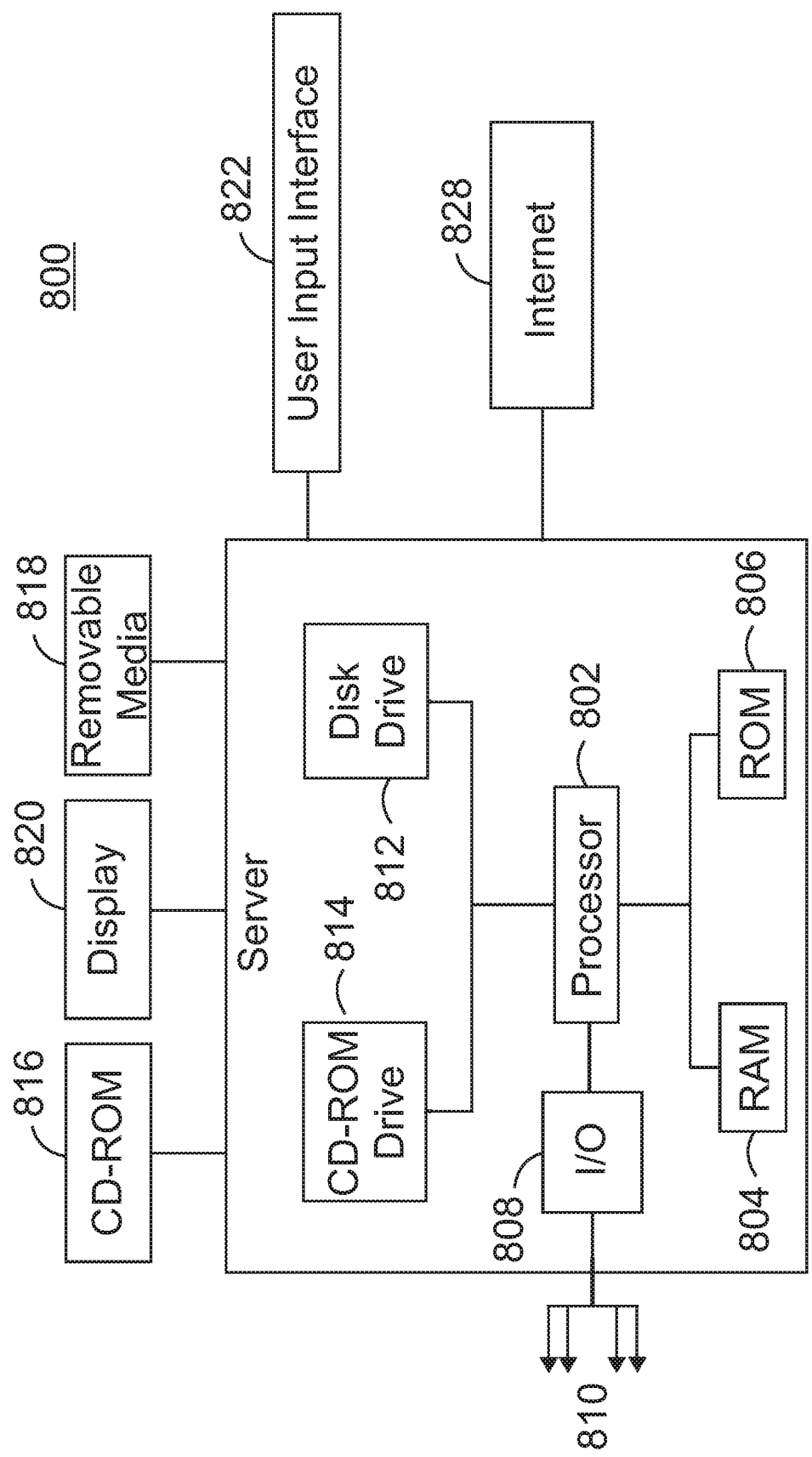
FIG. 8 illustrates a computing unit in which one or more of the methods discussed above can be implemented.

The above-discussed procedures and methods may be implemented in a computing device as illustrated in FIG. 8. Hardware, firmware, software or a combination thereof may be used to perform the various steps and operations described herein. Computing device 800 of FIG. 8 is an exemplary computing structure that may be used in connection with such a system.

Exemplary computing device 800 suitable for performing the activities described in the above embodiments may include a server 801. Such a server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to various landline and/or mobile computing devices.

The disclosed embodiments provide devices and methods for waveform inversion for determining objects in a subsurface (or in general media). It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for partial differential equation inversion, the method comprising:
   receiving measured data do, wherein the measured data is a result of waves being emitted by a source, propagating through a medium toward an object, and being scattered from the object;
   selecting an objective function having first and second measures $N_1$ and $N_2$, wherein the objective function depends on three independent variables V, u, and f, V being a perturbation of a wave equation operator L from a background operator $L_0$, u being a wavefield that satisfies the wave equation operator L, and f being a source function that describes the source of the waves;
   optimizing with a processor the objective function by finding a minimum or a maximum using the partial differential equation inversion;
   calculating with the processor solutions V*, u*, and f* of the three independent variables V, u, and f that minimizes or maximizes the objective function; and
   generating with the processor an image of the object from which the waves are scattered, based on the solutions V*, u*, and f*, so that a location of the object in the image is determined.

2. The method of claim 1, wherein the measured data are seismic data.

3. The method of claim 1, wherein the first measure $N_1$ of the objective function estimates a distance between (1) the measured data and (2) a projection operator C applied on the wavefield u.

4. The method of claim 3, wherein the second measure $N_2$ of the objective function estimates a distance between (1) a sum of the perturbation V and the background operator $L_0$ applied to the wavefield u, and (2) the source function f.

5. The method of claim 1, wherein the inversion is applied to the three independent variables V, u, and f to calculate linearized updates of each of the three independent variables.

6. The method of claim 1, wherein the first measure $N_1$ is different from the second measure $N_2$.

7. A method for partial differential equation inversion, the method comprising:
   receiving measured data $d_0$, wherein the measured data is a result of waves being emitted by a source, propagating through a medium toward an object, and being scattered from the object;
   defining a force function $f_e$ based on three variables V, u, and f, where V is a perturbation of a wave equation operator L from a background operator $L_0$, u is a wavefield that satisfies the wave equation operator L, and f is a source function that describes the source of the waves;

selecting a first objective function having first and second measures $N_1$ and $N_2$, the first objective function depending on the wavefield u and the force function $f_e$;

optimizing with a processor the first objective function by finding a minimum or a maximum using the partial differential equation inversion;

calculating with the processor solutions u* and $f_e$* of the two independent variables u and $f_e$ that minimizes or maximizes the first objective function;

selecting a second objective function having the first and second measures $N_1$ and $N_2$, the second objective function depending on the perturbation V and the source function f;

optimizing with the processor the second objective function by finding a minimum or a maximum using the partial differential equation inversion;

calculating with the processor solutions V* and f* of the two independent variables V and f that minimize or maximize the second objective function; and generating with the processor an image of the object from which the waves are scattered, based on the solutions V* and f*, so that a location of the object in the image is determined.

8. The method of claim 7, wherein the force function $f_e$ is defined as the second measure $N_2$ between (1) the perturbation V applied to the wavefield u, and (2) the source function f.

9. The method of claim 7, wherein, for the first objective function, the first measure $N_1$ is applied between (1) a projection operator C acting on the wavefield u, and (2) the measured data $d_0$.

10. The method of claim 9, wherein, for the first objective function, the second measure $N_2$ is applied between (1) the background operator Lo applied to the wavefield u and (2) the force function $f_e$.

11. The method of claim 10, wherein, for the second objective function, the first measure $N_1$ is applied between (1) the force function $f_e$ and (2) the second measure $N_2$.

12. The method of claim 11, wherein, for the second objective function, the second measure $N_2$ is applied between (1) the perturbation operator V applied to the wavefield u and (2) the source function f.

13. The method of claim 7, wherein the measured data is seismic data, the wave equation operator L includes a partial differentiation operator, and the operator L, when applied to the wavefield u, is equal to the source function f.

14. The method of claim 7, wherein the first measure $N_1$ is different from the second measure $N_2$.

15. A method for partial differential equation inversion, the method comprising:

receiving measured data $d_0$, wherein the measured data is a result of waves being emitted by a source, propagating through a medium toward an object, and being scattered from the object;

selecting a Green's function G, which generates estimated data $d_s$ when applied to a source function f, wherein the source function f describes the source of the waves;

selecting an objective function having first and second measures $N_1$ and $N_2$, wherein the objective function depends on two independent variables G and f;

optimizing with a processor the objective function by finding a minimum or a maximum using the partial differential equation inversion;

calculating with the processor solutions G* and f* of the two independent variables G and f so that the objective function is minimized or maximized; and generating with the processor an image of the object from which the waves are scattered, based on the solutions G* and f*, so that a location of the object in the image is determined.

16. The method of claim 15, wherein the first measure $N_1$ of the objective function estimates a distance between (1) the measured data do and (2) a projection operator C applied to the Green's function G, which in turn is applied to the source function f.

17. The method of claim 16, wherein the second measure $N_2$ of the objective function estimates a distance between (1) an identity matrix and (2) a wave equation operator L applied to the Green's function G, wherein the wave equation operator L describes a propagation of a wavefield u through the medium in which the object is embedded.

18. The method of claim 15, wherein the objective function includes a third independent variable, a wave equation operator L, wherein the wave equation operator L describes a propagation of a wavefield u through the medium in which the object is embedded.

19. The method of claim 15, wherein the objective function includes a third independent variable, a perturbation operator V, wherein the perturbation operator V perturbs a background wave equation operator $L_0$ to a wave equation operator L, and wherein the wave equation operator L describes a propagation of a wavefield u through the medium in which the object is embedded.

20. The method of claim 15, wherein at least one of the first and second measures $N_1$ and $N_2$ or both include a Lippmann Schwinger equation.

* * * * *